United States Patent
Eom et al.

(10) Patent No.: US 8,407,727 B2
(45) Date of Patent: Mar. 26, 2013

(54) METHOD AND APPARATUS FOR DRIVING PRINTER DRIVER ACCORDING TO A DETERMINED APPLICATION AND METHOD AND APPARATUS FOR INSTALLING THE PRINTER DRIVER

(75) Inventors: Yong-In Eom, Hwaseong-si (KR); Young-soo Han, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1118 days.

(21) Appl. No.: 12/187,478

(22) Filed: Aug. 7, 2008

(65) Prior Publication Data
US 2009/0100445 A1 Apr. 16, 2009

(30) Foreign Application Priority Data
Oct. 10, 2007 (KR) .................. 10-2007-0102138

(51) Int. Cl.
*G06F 9/44* (2006.01)
(52) U.S. Cl. ........................ 719/321; 719/327
(58) Field of Classification Search .................. 719/310, 719/321, 327
See application file for complete search history.

(56) References Cited

U.S. PATENT DOCUMENTS

| | | | |
|---|---|---|---|
| 5,228,118 A * | 7/1993 | Sasaki | 358/1.13 |
| 6,814,420 B2 * | 11/2004 | Fujita et al. | 347/15 |
| 7,865,105 B2 * | 1/2011 | Abe | 399/82 |
| 7,907,313 B2 * | 3/2011 | Kurihara | 358/500 |
| 7,916,330 B2 * | 3/2011 | Wada et al. | 358/1.15 |
| 2002/0054320 A1 * | 5/2002 | Ogino | 358/1.15 |
| 2005/0012951 A1 * | 1/2005 | Madril et al. | 358/1.13 |
| 2005/0225795 A1 * | 10/2005 | Nuggehalli et al. | 358/1.15 |
| 2007/0016902 A1 * | 1/2007 | Shozaki et al. | 717/174 |
| 2007/0097400 A1 * | 5/2007 | Yasui et al. | 358/1.13 |
| 2007/0171448 A1 * | 7/2007 | Liu | 358/1.13 |
| 2007/0216926 A1 * | 9/2007 | Kurihara | 358/1.13 |
| 2007/0216944 A1 * | 9/2007 | Furuya | 358/1.15 |
| 2009/0063718 A1 * | 3/2009 | Sekine et al. | 710/8 |
| 2009/0268234 A1 * | 10/2009 | Furuya | 358/1.15 |

FOREIGN PATENT DOCUMENTS

| | | |
|---|---|---|
| KR | 10-2005-0077834 | 8/2005 |
| KR | 10-0578434 | 5/2006 |
| KR | 10-2007-0022534 | 2/2007 |
| KR | 10-2007-0094546 | 9/2007 |

OTHER PUBLICATIONS

Korean Office Action dated May 10, 2012 from Korean Patent Application 10-2007-0102138.
Korean Notice of Allowance dated Nov. 29, 2012 from Korean Patent Application No. 10-2007-0102138.

* cited by examiner

*Primary Examiner* — Van Nguyen
(74) *Attorney, Agent, or Firm* — Staas & Halsey LLP

(57) ABSTRACT

Disclosed is a method and apparatus for driving a printer driver based on a determined type of application, and driving one of an extensible markup language (XML) paper specification (XPS) driver and a legacy driver in accordance with the determined type of application. The most appropriate printer driver may be automatically selected in accordance with the determined type of application. Thus, a user does not have to inconveniently select a printer driver whenever the user prints data and the data may be printed using the most appropriate printer driver. Furthermore, an optimized printing operation may be performed even when a user does not check whether an application to be used is a particular type of application, or whether a printer driver corresponding to the application is an XPS driver or a legacy driver.

24 Claims, 3 Drawing Sheets

METHOD AND APPARATUS FOR DRIVING PRINTER DRIVER ACCORDING TO A DETERMINED APPLICATION AND METHOD AND APPARATUS FOR INSTALLING THE PRINTER DRIVER

CROSS-REFERENCE TO RELATED APPLICATION

This application claims all benefits accruing under 35 U.S.C. §119 from Korean Patent Application No. 2007-102138, filed on Oct. 10, 2007, in the Korean Intellectual Property Office, the disclosure of which is incorporated herein by reference.

BACKGROUND OF THE INVENTION

1. Field of the Invention

Aspects of the present invention relate to a method and apparatus for driving a printer driver according to a determined type of application, and more particularly, to a method and apparatus for driving the printer driver according to the determined type of application and a method and apparatus for installing a printer driver, in which the printer driver may be automatically selected and driven in accordance with the determined type of application.

2. Description of the Related Art

With the release of Windows Vista, users can print data by using two primary methods. One method uses an extensible markup language (XML) paper specification (XPS) driver. Another method uses a printer control language (PCL) driver, a postscript (PS) driver, or a graphical device interface (GDI) driver, referred to as legacy drivers. Conventionally, users have printed data by using the legacy driver. However, the XPS driver released with Windows Vista filters XPS data generated by a Windows Presentation Foundation (WPF) application or a GDI-to-XPS converter and converts the filtered XPS data into a data format used by a user so as to perform a printing operation.

However, applications may be of two types, such as, a WPF type or a Win32 type. Due to the two types of applications, the performance of each application may be optimized by using an appropriate printer driver. The performances of a WPF application and a Win32 application may be optimized by respectively using the XPS driver and the legacy driver.

If an inappropriate printer driver is used, data to be printed has to be converted by using a GDI-to-XPS converter or an XPS-to-GDI converter, before the data is printed. If a converter is used, the printing speed or printing quality is reduced. If a converter is not used, the Win32 application may not print data using the XPS driver and the WPF application may not print data using the legacy driver. Accordingly, a user has to be aware of the type of application being used and select an appropriate printer driver whenever performing a printing operation.

SUMMARY OF THE INVENTION

An aspect of the present invention provides a method and apparatus for driving a printer driver according to a determined type of application and a method and apparatus for installing a printer driver, in which an optimized printing operation may be performed by automatically selecting an appropriate printer driver in accordance with the determined type of application.

According to an aspect of the present invention, there is provided a method of driving a printer driver according to a determined type of application, the method including determining the type of application; and driving one of an extensible markup language (XML) paper specification (XPS) driver and a legacy driver in accordance with the determined type of application.

According to another aspect of the present invention, there is provided an apparatus for driving a printer driver according to a determined type of application, the apparatus including a memory for storing at least one of an XML paper specification (XPS) driver and a legacy driver; a type determination unit for determining the type of application; and a driving control unit for driving one of the XPS driver and the legacy driver in accordance with the determined type of application determined by the type determination unit.

According to another aspect of the present invention, there is provided a method of installing a printer driver, the method including selecting an automatic driving mode for automatically driving a printer driver according to a determined type of application; and installing an XML paper specification (XPS) driver or a legacy driver.

According to another aspect of the present invention, there is provided an apparatus for installing a printer driver, the apparatus including a user interface for selecting an automatic driving mode for automatically driving a printer driver according to a determined type of application; and a driver installation control unit for installing an XML paper specification (XPS) driver or a legacy driver.

Additional aspects and/or advantages of the invention will be set forth in part in the description which follows and, in part, will be obvious from the description, or may be learned by practice of the invention.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
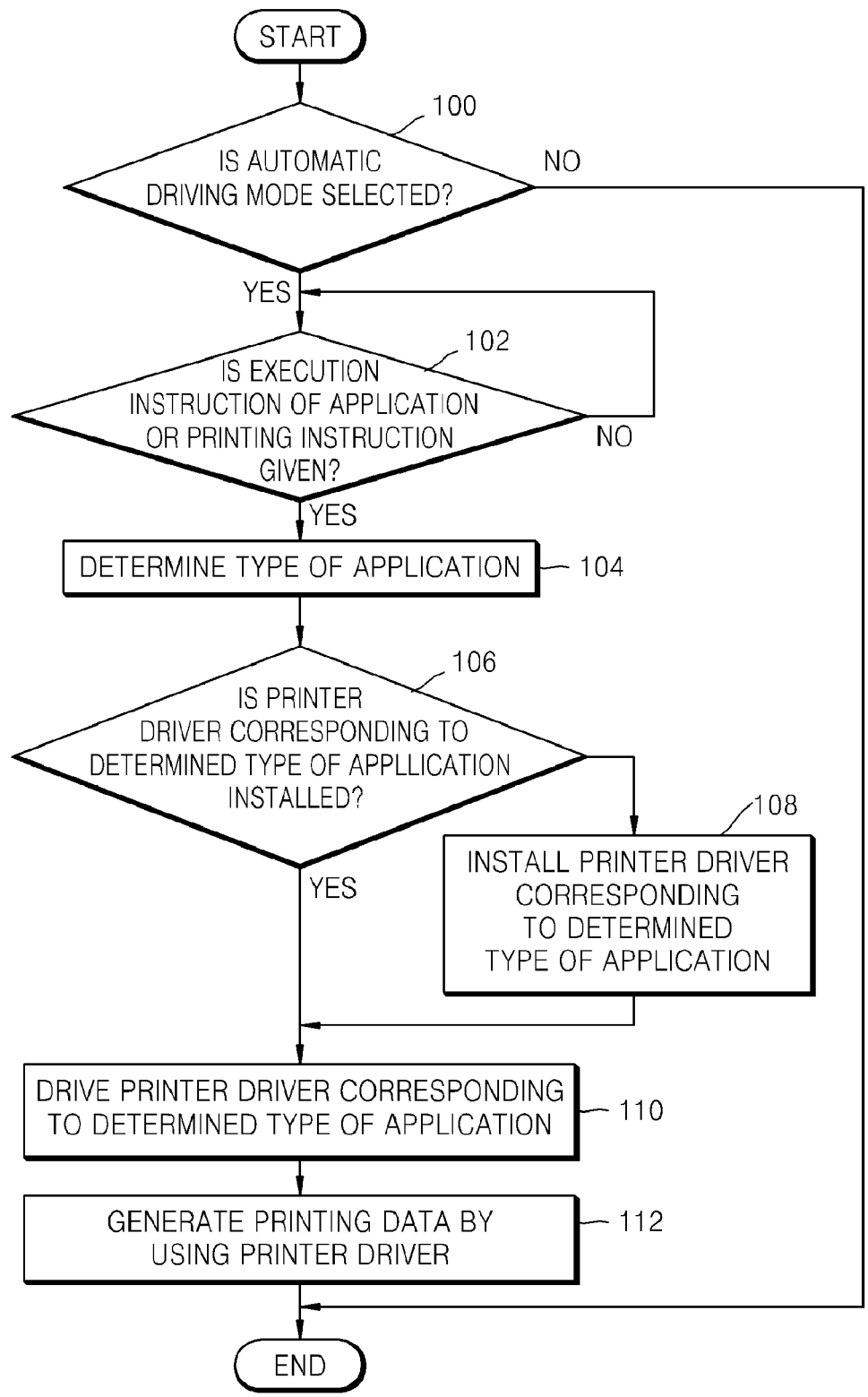
FIG. 1 is a flowchart illustrating a method of driving a printer driver corresponding to an application, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a flowchart illustrating a method of driving a printer driver corresponding to an application, according to an embodiment of the present invention. Such a method may be performed at a host.

Referring to FIG. 1, a determination is made of whether an automatic driving mode for automatically driving a printer driver is selected at operation 100. Here, the automatic driving mode is used to automatically determine the printer driver in accordance with the type of application. The automatic driving mode is divided into a quality priority mode and a speed priority mode. In the quality priority mode, the printer driver corresponding to the type of application is driven in order to improve the quality of printing. In the speed priority mode, the printer driver corresponding to the type of application is driven in order to improve the speed of printing. Accordingly, if the quality priority mode or the speed priority mode is selected, a Windows Presentation Foundation (WPF) application performs a printing operation using an extensible markup language (XML) paper specification (XPS) driver and a Win32 application performs a printing operation using a legacy driver.

The automatic driving mode may be selected by using a user interface of the printer driver or a user interface for executing the application.

If the automatic driving mode is selected at operation 100, a determination is made of whether an execution instruction or a printing instruction of the application is given at operation 102. The execution instruction of the application or the printing instruction corresponds to an execution instruction or a printing instruction of a user which is input by a user interface.

If the execution instruction of the application or the printing instruction is given at operation 102, the type of the application is determined at operation 104. Thereafter, a determination is made of whether the application to be executed is the Win32 application or the WPF application. The type of application is determined by using a function that is called by the application in order to drive the printer driver. The application has to call a certain function in order to drive the printer driver and the certain function is different according to the type of application. Thus, the type of application may be determined by checking the certain function.

Then, a determination is made of whether the printer driver corresponding to the determined type of application is installed at operation 106. That is, the host checks whether the legacy driver used in the Win32 application or the XPS driver used in the WPF application is installed. If the printer driver corresponding to the determined type of the application is installed, the method proceeds to operation 110.

However, if the printer driver corresponding to the determined type of application is not installed, the printer driver corresponding to the determined type of application is installed at operation 108. The printer driver corresponding to the determined type of application is received from a driver provider connected to a host (local system) or a network system, so as to be installed.

After operation 106 or operation 108 is performed, the printer driver corresponding to the determined type of application is driven at operation 110. If the printer driver corresponding to the determined type of application is the XPS driver, the XPS driver is driven. However, if the printer driver corresponding to the determined type of application is the legacy driver, the legacy driver is driven.

Then, printing data is generated by using the corresponding printer driver at operation 112. The generated printing data is transmitted to an image forming device so as to output printed data on a printable medium.

Figure 2:
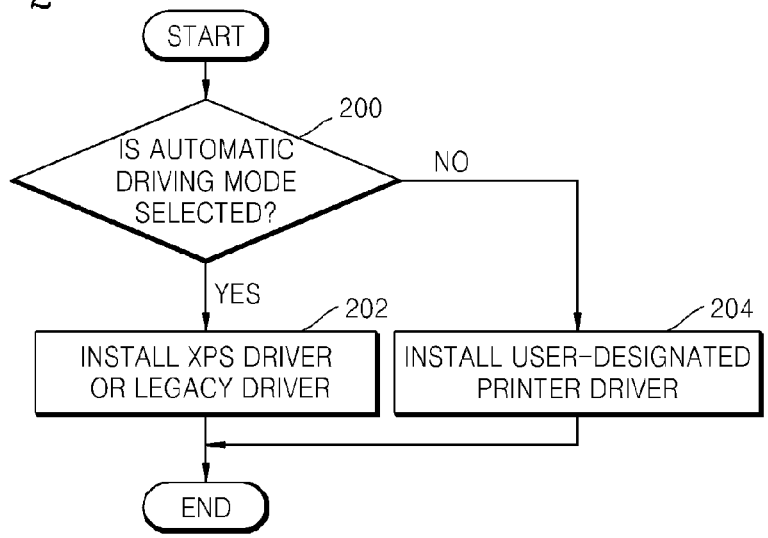
FIG. 2 is a flowchart illustrating a method of installing a printer driver, according to an embodiment of the present invention.

FIG. 2 is a flowchart illustrating a method of installing a printer driver, according to an embodiment of the present invention.

Referring to FIG. 2, a determination is made of whether an automatic driving mode for automatically driving a printer driver is selected at operation 200. Here, the automatic driving mode is used to automatically determine the printer driver in accordance with the type of application. The automatic driving mode includes one of an option for turning on or off the automatic driving mode, and an option for executing the automatic driving mode after the printer driver is installed. If the option for executing the automatic driving mode after the printer driver is installed is included, a user-designated printer driver is installed and the automatic driving mode is executed when data is actually printed after the printer driver is installed. The automatic driving mode is selected by a user interface for installing the printer driver. If the automatic driving mode is selected at operation 200, an XPS driver or a legacy driver is installed at operation 202.

Figure 3:
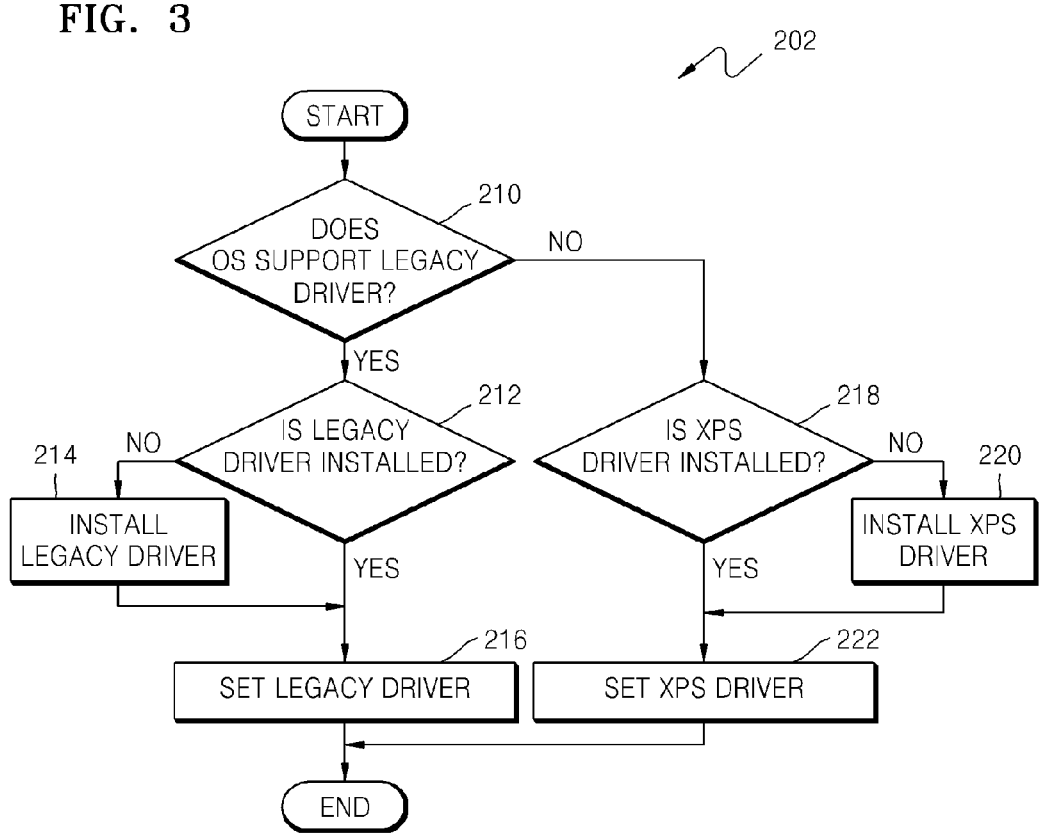
FIG. 3 is a detailed flowchart illustrating an operation of installing an XPS driver or a legacy driver, as illustrated in FIG. 2, according to an embodiment of the present invention.

FIG. 3 is a detailed flowchart illustrating operation 202 illustrated in FIG. 2, according to an embodiment of the present invention.

Referring to FIG. 3, firstly, the type of operating system (OS) is checked at operation 210. For example, a determination is made of whether the OS of a host is an OS supporting a legacy driver, such as a printer control language (PCL) driver, a postscript (PS) driver, or a graphical device interface (GDI) driver, or a Windows Vista OS supporting an XPS driver.

If the OS of the host is the OS supporting the legacy driver at operation 210, a determination is made of whether the legacy driver such as the PCL driver, the PS driver, or the GDI driver is installed at operation 212.

If the legacy driver is not installed, the legacy driver is installed at operation 214. The legacy driver is received from a driver provider that is connected to a host (local system) or a network system, so as to be installed.

If the legacy driver is installed, printer driver information of the host is set for the legacy driver at operation 216.

However, if the OS of the host is the Windows Vista OS supporting the XPS driver at operation 210, a determination is made at operation 218 of whether the XPS driver is installed.

If the XPS driver is not installed, the XPS driver is installed at operation 220. The XPS driver is received from the driver provider that is connected to the local system or the network system, so as to be installed.

If the XPS driver is installed, the printer driver information of the host is set for the XPS driver at operation 222.

However, referring back to FIG. 2, if the automatic driving mode is not selected at operation 200, a user-designated printer driver is installed at operation 204. Operation 204 is well known and thus, detailed descriptions thereof will be omitted here.

The above-described method according to an embodiment of the present invention can also be embodied as computer readable code/instructions/programs. Specifically, a computer readable recording medium having recorded thereon a computer program for executing a method including determining a type of application; and driving one of an XML paper specification (XPS) driver and a legacy driver in accordance with the determined type of application, is another aspect of the present invention.

For example, the embodiments of the present invention can be implemented in general-use digital computers that execute the programs using a computer readable recording medium. Examples of the computer readable recording medium include magnetic storage media (e.g. ROM, floppy disks, hard disks, etc.), optical recording media (e.g. CD-ROMs, or DVDs), and computer data signals embodied in carrier waves comprising a compression source code segment and an encryption source code segment (e.g. transmission through the Internet). Functional programs, code, and code segments for accomplishing the present invention can be easily construed by programmers of ordinary skill in the art to which the present invention pertains.

Hereinafter, an apparatus for driving a printer driver corresponding to an application and an apparatus for installing a printer driver will be described in detail by explaining embodiments of the present invention with reference to FIG. 4.

Figure 4:
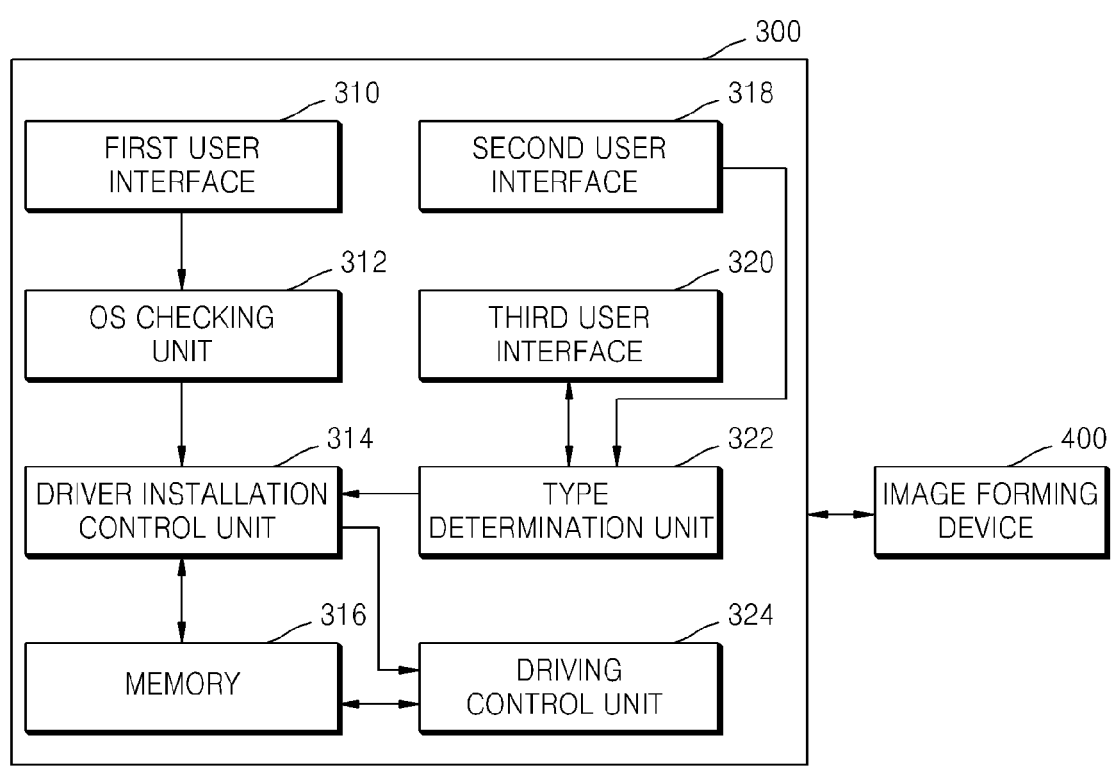
FIG. 4 is a block diagram for describing an apparatus for driving a printer driver corresponding to an application and an apparatus for installing a printer driver, according to embodiments of the present invention.

FIG. 4 is a block diagram for describing an apparatus for driving a printer driver corresponding to an application and an apparatus for installing a printer driver, according to embodiments of the present invention.

Referring to FIG. 4, the apparatus for driving and installing a printer driver corresponds to a host 300. In addition, an image forming device 400 is illustrated. The host 300 includes a first user interface 310, an OS checking unit 312, a driver installation control unit 314, a memory 316, a second user interface 318, a third user interface 320, a type determination unit 322, and a driving control unit 324.

The first user interface 310 selects an automatic driving mode for automatically driving a printer driver corresponding to the type of application. The automatic driving mode is used to automatically determine the printer driver in accordance with the type of application. Here, the first user interface 310 corresponds to a user interface for installing the printer driver. The first user interface 310 includes one of an option for turning on or off the automatic driving mode, and an option for executing the automatic driving mode after the printer driver is installed. If the option for executing the automatic driving mode after the printer driver is installed is included, a user-designated printer driver is installed and the automatic driving mode is executed when data is actually printed after the printer driver is installed. The first user interface 310 outputs a selecting result of the automatic driving mode to the OS checking unit 312.

The OS checking unit 312 checks the type of an OS of the host 300 and outputs a checking result to the driver installation control unit 314. For example, the OS checking unit 312 checks whether the OS of the host 300 is an OS supporting a legacy driver such as a PCL driver, a PS driver, or a GDI driver, or a Windows Vista OS supporting an XPS driver.

The driver installation control unit 314 installs a printer driver corresponding to the type of OS of the host 300, in accordance with the checking result of the OS checking unit 312. If the OS of the host 300 is the OS supporting the legacy driver, the driver installation control unit 314 installs the legacy driver. However, if the OS of the host 300 is the Windows Vista OS supporting the XPS driver, the driver installation control unit 314 installs the XPS driver. The driver installation control unit 314 requests a driver provider (not shown) that is connected to a local system or a network system of the host 300, for the legacy driver or the XPS driver, receives the legacy driver or the XPS driver from the driver provider, and stores the legacy driver or the XPS driver in the memory 316.

The driver installation control unit 314 sets printer driver information of an installed printer driver, such as the legacy driver or the XPS driver, so as to correspond to the type of OS.

The memory 316 stores the legacy driver or the XPS driver in accordance with the control of the driver installation control unit 314.

Each of the second and third user interfaces 318 and 320 selects the automatic driving mode for automatically driving the printer driver corresponding to the type of application. Here, the second user interface 318 corresponds to a user interface of the printer driver and the third user interface 320 corresponds to a user interface for executing the application. Each of the second and third user interfaces 318 and 320 includes one of the option for turning on or off the automatic driving mode, and the option for executing the automatic driving mode after the printer driver is installed. Each of the second and third user interfaces 318 and 320 outputs a selecting result of the automatic driving mode to the type determination unit 322.

The third user interface 320 receives an execution instruction of the application or a printing instruction from a user. The third user interface 320 may select one of a quality priority mode and a speed priority mode. In the quality priority mode, the printer driver corresponding to the type of application is driven in order to improve the quality of printing. In the speed priority mode, the printer driver corresponding to the type of application is driven in order to improve the speed of printing.

In response to the selecting result of each of the second and third user interfaces 318 and 320, the type determination unit 322 determines the type of application that is executed in the host 300 and outputs a determining result to the driver installation control unit 314 and the driving control unit 324. The type determination unit 322 checks whether the application to be executed is a Win32 application or a WPF application. The type of application is determined by using a function that is called by the application in order to drive the printer driver.

In response to a determining result of the type determination unit 322, the driver installation control unit 314 checks whether the printer driver corresponding to the determined type of application is installed and installs the printer driver corresponding to the determined type of application. The driver installation control unit 314 checks whether the legacy driver used in the Win32 application or the XPS driver used in the WPF application is installed in the host 300. If the legacy driver or the XPS driver is not installed, the driver installation control unit 314 stores the legacy driver or the XPS driver in the memory 320 and outputs a storing result to the driving control unit 324. The driver installation control unit 314 requests the driver provider that is connected to the local system or the network system of the host 300, for the legacy driver or the XPS driver, receives the legacy driver or the XPS driver from the driver provider, and installs the legacy driver or the XPS driver.

In response to an installation result of the driver installation control unit 314, the driving control unit 324 drives one of the legacy driver and the XPS driver in accordance with the determined type of application. If the printer driver corresponding to the determined type of application is the XPS driver, the driving control unit 324 drives the XPS driver. If the printer driver corresponding to the determined type of application is the legacy driver, the driving control unit 324 drives the legacy driver. The printer driver driven by the driving control unit 324 generates printing data and transmits the generated printing data to the image forming device 400. Then, the image forming device 400 reads the printing data so as to perform a printing operation.

According to an embodiment of the present invention, the most appropriate printer driver is automatically selected in accordance with the type of application. Thus, a user may not inconveniently select a printer driver whenever the user prints data and the data may be printed by using the most appropriate printer driver.

Furthermore, in consideration of various types of applications, such as, a WPF application, applications including Microsoft Photo Gallery and New York Times Reader, and other applications including Kiosks, AutoDesk, OmniPage Pro, and Office 14, which are to be released in the future, and a conventional Win32 application, an optimized printing operation may be performed even when a user does not check whether an application to be used is a WPF application or a Win32 application and whether a printer driver corresponding to the application is an XPS driver or a legacy driver such as a PCL, GDI, or PS driver.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. A method of driving a printer driver according to a type of application, the method comprising:
   checking whether an automatic driving mode for automatically driving the printer driver according to the type of application is enabled;
   determining the type of application when the automatic driving mode is enabled; and
   driving one of an extensible markup language (XML) paper specification (XPS) driver and a legacy driver in accordance with the determined type of application,
   wherein the automatic driving mode includes a quality priority mode and a speed priority mode, and the automatic driving mode is enabled when at least one of the quality priority mode and speed priority mode are selected.

2. The method of claim 1, wherein the determining of the type of application comprises determining whether the application is a Win32 type application or a Windows Presentation Foundation (WPF) type application.

3. The method of claim 1, wherein the determining of the type of application comprises using a function requested by the application in order to drive the printer driver.

4. The method of claim 1, wherein the automatic driving mode includes one of an option for turning on or off the automatic driving mode, and an option for executing the automatic driving mode after the printer driver is installed.

5. The method of claim 1, further comprising:
   checking whether the printer driver corresponding to the determined type of application is installed; and
   installing the printer driver corresponding to the determined type of application if the printer driver corresponding to the determined type of application is not installed.

6. The method of claim 1, further comprising checking whether an execution instruction of the application or a printing instruction is given.

7. The method of claim 1, further comprising generating printing data by using one of the extensible markup language (XML) paper specification (XPS) driver and a legacy driver.

8. A method of installing a printer driver, the method comprising:
   checking whether an automatic driving mode for automatically driving the printer driver according to the type of application is enabled; and
   installing an extensible markup language (XML) paper specification (XPS) driver or a legacy driver, when the automatic driving mode is enabled,
   wherein the automatic driving mode includes a quality priority mode and a speed priority mode, and the automatic driving mode is enabled when at least one of the quality priority mode and speed priority mode are selected.

9. The method of claim 8, wherein the automatic driving mode includes one of an option for turning on or off the automatic driving mode, and an option for executing the automatic driving mode after a printer driver is installed.

10. The method of claim 8, further comprising checking a type of an operating system (OS) and setting the printer driver corresponding to the type of OS.

11. An apparatus for driving a printer driver according to a type of application, the apparatus comprising:
    a checking unit to check whether an automatic driving mode for automatically driving the printer driver according to the type of application is enabled;
    a memory for storing at least one of an extensible markup language (XML) paper specification (XPS) driver and a legacy driver;
    a type determination unit for determining the type of application, when the automatic driving mode is enabled; and
    a driving control unit for driving one of the XPS driver and the legacy driver in accordance with the determined type of application,
    wherein the automatic driving mode includes a quality priority mode and a speed priority mode, and the automatic driving mode is enabled when at least one of the quality priority mode and speed priority mode are selected.

12. The apparatus of claim 11, wherein the type determination unit determines whether the type of application is a Win32 type application or a Windows Presentation Foundation (WPF) type application.

13. The apparatus of claim 11, wherein the type determination unit determines the type of application by using a function requested by the application in order to drive the printer driver.

14. The apparatus of claim 11, further comprising a user interface for selecting an automatic driving mode for automatically driving the printer driver corresponding to the type of application.

15. The apparatus of claim 14, wherein the user interface comprises a user interface of the printer driver and a user interface of the application.

16. The apparatus of claim 11, further comprising a driver installation control unit for checking whether the printer driver corresponding to the determined type of application is installed and installing the printer driver corresponding to the determined type of application if the printer driver corresponding to the determined type of application is not installed.

17. The apparatus of claim 11, wherein the apparatus generates printing data by using one of the extensible markup language (XML) paper specification (XPS) driver and a legacy driver.

18. An apparatus for installing a printer driver, the apparatus comprising:
- a user interface for receiving the result of selection by a user whether to enable an automatic driving mode for automatically driving a printer driver according to a type of application;
- a checking unit to check whether an automatic driving mode for automatically driving the printer driver according to the type of application is enabled; and
- a driver installation control unit for installing an extensible markup language (XML) paper specification (XPS) driver or a legacy driver, when the automatic driving mode is enabled,
- wherein the automatic driving mode includes a quality priority mode and a speed priority mode, and the automatic driving mode is enabled when at least one of the quality priority mode and speed priority mode are selected.

19. The apparatus of claim 18, further comprising an OS checking unit for checking a type of operating system (OS),
- wherein the driver installation control unit sets the printer driver corresponding to the type of OS.

20. The apparatus of claim 18, wherein the user interface receives one of an option for turning on or off the automatic driving mode, and an option for executing the automatic driving mode after a printer driver is installed.

21. An apparatus for installing a printer driver, comprising:
- a user interface for receiving the result of selection by a user whether to enable an automatic driving mode for automatically driving a printer driver according to a type of application used for printing data on a printable medium;
- a checking unit to check whether an automatic driving mode for automatically driving the printer driver according to the type of application is enabled;
- a determination type unit for determining the type of application required for printing the data by checking a specified function performed by the application, when the automatic driving mode is enabled;
- a driver installation control unit for installing the printer driver corresponding to the determined type of application required for printing the data on the printable medium; and
- a memory for storing the printer driver corresponding to the determined type of application,
- wherein the automatic driving mode includes a quality priority mode and a speed priority mode, and the automatic driving mode is enabled when at least one of the quality priority mode and speed priority mode are selected.

22. The apparatus according to claim 21, wherein the printer driver includes an XML paper specification (XPS) driver or a legacy driver.

23. The apparatus according to claim 21, wherein the type of application includes at least one of a Windows Presentation Foundation (WPF) type application and a Win32 type application.

24. A method of installing a printer driver, the method comprising:
- receiving the result of selection by a user whether to enable an automatic driving mode for automatically driving a printer driver according to a type of application used for printing data;
- checking whether an automatic driving mode for automatically driving the printer driver according to the type of application is enabled;
- determining the type of application by checking a specified function performed by the application, when the automatic driving mode is enabled;
- determining whether the printer driver corresponding to the determined type of application is installed, when the automatic driving mode is enabled; and
- installing the printer driver corresponding to the determined type of application, when the automatic driving mode is enabled,
- wherein the automatic driving mode includes a quality priority mode and a speed priority mode, and the automatic driving mode is enabled when at least one of the quality priority mode and speed priority mode are selected.

* * * * *